United States Patent
Gruber et al.

(10) Patent No.: US 7,258,540 B2
(45) Date of Patent: Aug. 21, 2007

(54) APPARATUS FOR CALIBRATING AN EXTRUDED PLASTIC PROFILE PIECE THAT FORMS AT LEAST ONE LONGITUDINAL GROOVE

(75) Inventors: Dietmar Gruber, Schlierbach (AT); Erwin Krumböck, Ansfelden (AT)

(73) Assignee: Gruber & Co Group GmbH, Kremsmünster (AT)

( * ) Notice: Subject to any disclaimer, the term of this patent is extended or adjusted under 35 U.S.C. 154(b) by 0 days.

(21) Appl. No.: 10/555,512

(22) PCT Filed: Jun. 9, 2004

(86) PCT No.: PCT/AT2004/000199

§ 371 (c)(1),
(2), (4) Date: Nov. 3, 2005

(87) PCT Pub. No.: WO2004/108394

PCT Pub. Date: Dec. 16, 2004

(65) Prior Publication Data

US 2006/0280827 A1   Dec. 14, 2006

(30) Foreign Application Priority Data

Jun. 10, 2003   (AT) ............................... A897/2003

(51) Int. Cl.
*B29C 47/90* (2006.01)
(52) U.S. Cl. .................. 425/384; 425/190; 425/192 R
(58) Field of Classification Search .................. 425/71, 425/190, 192 R, 384, 388
See application file for complete search history.

(56) References Cited

U.S. PATENT DOCUMENTS

| | | | |
|---|---|---|---|
| 4,401,424 A | 8/1983 | De Zen | 425/388 |
| 6,296,464 B1 * | 10/2001 | Purstinger | 425/388 |
| 6,682,330 B2 * | 1/2004 | Kossl | 425/71 |
| 6,814,559 B2 * | 11/2004 | Kossl | 425/388 |
| 2003/0012834 A1 | 1/2003 | Kossl | 425/71 |

* cited by examiner

*Primary Examiner*—Robert Davis
*Assistant Examiner*—Joseph Leyson
(74) *Attorney, Agent, or Firm*—Collard & Roe, P.C.

(57) ABSTRACT

An apparatus for calibrating an extruded plastic profile forming at least one longitudinal groove (5), comprises a calibrating body (1) receiving the profile (2). Body (2) comprises a form nose (6) with a cooling channel (9) engaging in the longitudinal groove (5) and extending in the direction of passage of the profile, and coolant bores (13, 14, 26) extending transversally to the form nose (6) and crossing its cooling channel (9). Cooling channel (9) which is open on both face sides is connected via a continuous slot (10) with a receiving recess (11) for sealing elements (12) which are inserted from the open face sides and form connecting openings (19) for the flow connection between the cooling channel (9) and the associated coolant bores (13, 26), which receiving recess penetrates the calibrating body (1) in the direction of passage and extends into the region of the coolant bores (13, 14, 26)

7 Claims, 5 Drawing Sheets

APPARATUS FOR CALIBRATING AN EXTRUDED PLASTIC PROFILE PIECE THAT FORMS AT LEAST ONE LONGITUDINAL GROOVE

CROSS REFERENCE TO RELATED APPLICATIONS

This application is the National Stage of PCT/AT2004/000199, filed on Jun. 9, 2004, which claims the benefit of Austrian Patent Application No. A 897/2003, filed on Jun. 10, 2003.

FIELD OF THE INVENTION

The invention relates to an apparatus for calibrating an extruded plastic profile forming at least one longitudinal groove, comprising a calibrating body receiving the profile strand emerging from a shaping extrusion die for profiles, the body comprising a form nose with a cooling channel engaging in the longitudinal groove of the profile strand and extending in the direction of passage of the profile strand, and coolant bores extending transversally to the form nose and crossing its cooling channel.

DESCRIPTION OF THE PRIOR ART

During the extrusion of a plastic profile, the hot profile strand emerging from the shaping profile extrusion die is calibrated and cooled. This cooling is of especial importance in the inlet region of the calibrating apparatus because the friction between the hot profile strand and the calibrating body receiving this profile strand depends on the temperature of the calibrating body in the region of the calibrating surfaces resting against the profile strand. If this temperature rises beyond a critical value of usually 50 to 70° C., the frictional forces exceed the tensile strength of the not yet solidified profile strand, which can then no longer be withdrawn. The calibrating body receiving the hot profile strand must therefore be cooled especially well in the inlet region, which naturally causes problems at places where the cross section of the calibrating body does not allow any generously dimensioned cooling channels. This is always the case when the extruded plastic profile has longitudinal grooves with a comparatively small cross section in which a form nose of the calibrating body engages for calibration, which form nose extends in the direction of passage. These form noses need to be drilled laboriously for forming cooling channels and their connections. It is necessary to ensure a separate cooling circulation because the cooling channels cannot be configured to extend parallel to the usual coolant bores that have a larger cross section due to the small flow cross section without endangering the forced circular flow in the region of these cooling channels. The cooling channels in the region of the form noses of the calibrating body have a considerably larger flow resistance as a result of their small cross section than the usual coolant bores that have a larger cross section.

The cooling channels with their separate connections in the region of the form noses of the calibrating body are of a complex configuration not only concerning their construction but also concerning their maintenance. Due to unavoidable contamination of the coolant, which usually is caused by water, a constriction of the flow cross section can occur and thus to an insufficient cooling of the form noses. This means that the cooling channels need to be opened regularly in the region of the form noses, which is a complex matter in the provided face-side seals because these seals consist of pressed-in or glued-in sealing plugs which become useless after removal.

SUMMARY OF THE INVENTION

The invention is thus based on the object of providing an apparatus for calibrating an extruded plastic profile of the kind mentioned above in such away that the constructional effort required for providing cooling channels in the region of the form noses can be reduced to a considerable extent. Moreover, the maintenance of these cooling channels is to be simplified.

This object is achieved by the invention in such a way that the cooling channel which is open on both face sides is connected via a continuous slot with a receiving recess for sealing elements which can be inserted from the open face sides and form the connecting openings for the flow connection between the cooling channel and the associated coolant bores, which receiving recess penetrates the calibrating body in the direction of passage and extends into the region of the coolant bores.

Since the cooling body does not require any complex connection bores for the cooling channel as a result of these measures (the connection between the cooling channel and the coolant bores crossing the cooling channel at a distance is achieved by separate sealing elements), a comparatively simple production of the cooling channel jointly with the connection slot for the receiving recess for the sealing elements is obtained as a result of the progress of these openings which continue in the direction of passage of the profile strand, which openings can thus be produced simultaneously with the calibrating surfaces and the form nose by wire erosion for example. The fact that the sealing elements extend into the region of the coolant bores provided for the supply and discharge of the coolant simplifies the connection of the cooling channel in the form nose of the calibrating body with the coolant bores via the sealing the elements because the sealing elements merely need to have respective connection openings for the flow connection between the cooling channel and the associated coolant bores. An additional factor is that the sealing elements are used for sealing off the open face sides of the pass-through opening of the calibrating body which is formed by the cooling channel, the connection slot and the receiving recess for the sealing elements, which provides advantageous mounting conditions.

In order to advantageously meet this closing function of the sealing elements, the sealing elements may comprise a molding body engaging in the receiving recess and comprising an outer face wall which outwardly seals the cooling channel, the receiving recess and the slot between the cooling channel and the receiving recess. If this face wall is provided with a circular boundary web which extends conically to the outside, a liquid-tight seal is obtained on pressing the face wall into the associated opening of the calibrating body without having to take any additional sealing measures.

If the coolant bores for the supply and discharge of the coolant to the cooling channel end in the region of the receiving recess for the sealing elements, a circular flow through the cooling channel is achieved via the connection openings of the sealing elements inserted into the receiving recess. This circular flow is endangered however when the coolant bore for the coolant supply penetrates the receiving recess in order to also supply other parts of the calibrating body with coolant. In this case there is a flow division according to the prevailing flow resistances, leading to an insufficient supply of the cooling channel with coolant in the form nose. For the purpose of adjusting the different flow resistances in the region of the coolant bores and the cooling channel, the molding bodies of the sealing elements can carry inserts in the pass-through region of coolant bores penetrating the receiving recess, which inserts control the flow rate through the coolant bores. With an insert forming a respective throttling position for the associated coolant bore it is thus possible to achieve an equalization of the flow resistances with the effect that the coolant flow is divided at a desired ration into the cooling channel and the continuing section of the coolant bore.

Such inserts for the sealing elements in the region of the penetration of the coolant bores through the receiving recesses of the calibrating body can also be used to additionally control an intermediate output of the connection openings of the sealing elements, so that the discharge of the cooling channel in the form nose of the calibrating body is connected with a coolant bore penetrating the receiving recess for the sealing elements or is blocked relative to this coolant bore in order to enable a connection to a further coolant bore.

A sufficient flow rate of the coolant through the cooling channel must be ensured for cooling the form nose of the calibrating body. Since the cooling channel is connected by a connecting slot with the receiving recess for the sealing elements, a coolant flow which is parallel to the cooling channel can form depending on the flow conditions within the connecting slot, which flow may under certain circumstances impair the cooling of the form nose. In order to suppress this parallel coolant flow through the connecting slot, the molding bodies of the sealing elements can comprise webs projecting into the connecting slot to the cooling channel. In the case of larger distances between the face-side sealing elements, a coolant flow which is parallel to the cooling channel can also form via the receiving recess for the sealing elements. In order to prevent this, a filling element can be inserted between the sealing elements in the receiving recess of the calibrating body.

As already explained, the respectively required connection between the coolant bores in the cooling body and the cooling channel in the form nose can be produced via the sealing elements and via inserts which may optionally be provided in the sealing elements and are preferably exchangeable without requiring any additional constructional effort in this respect. This also ensures joining the connection opening of the sealing element associated with the discharge end of the cooling channel with a separate coolant bore for coolant discharge in order to enable the monitoring of the proper flow of the coolant through the cooling channel on the basis of the coolant flowing from said coolant bore.

BRIEF DESCRIPTION OF THE DRAWINGS

The subject matter of the invention is shown in the drawings by way of example, wherein.

DESCRIPTION OF THE PREFERRED EMBODIMENT

Figure 1:
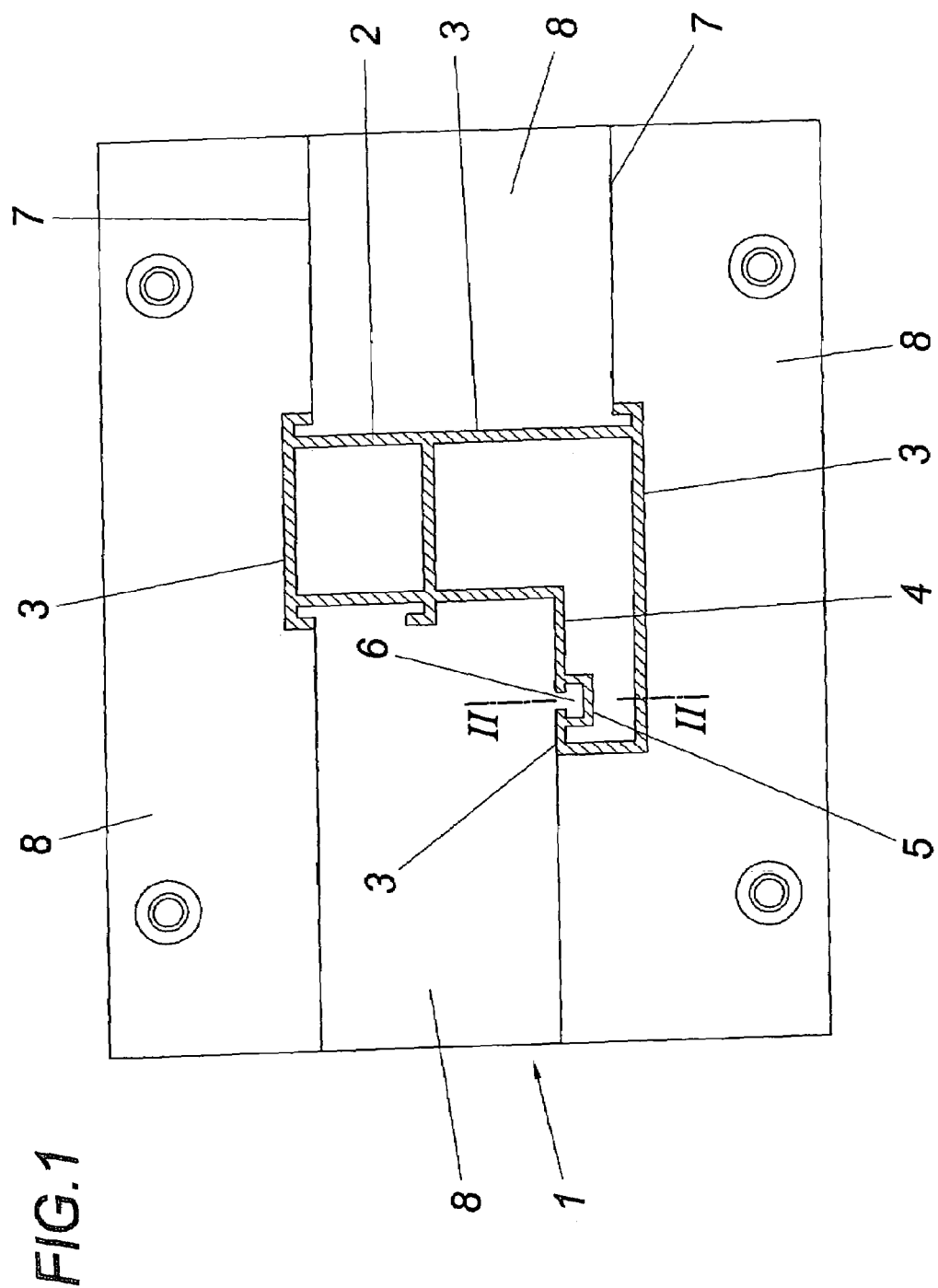
FIG. 1 shows an apparatus in accordance with the invention for calibrating an extruded plastic profile in a face view of the calibrating body receiving the profile strand.

As is shown in FIG. 1, the calibrating apparatus comprises a calibrating body 1 which receives the profile strand 2 of a plastic profile emerging from the extrusion die for profiles. The pass-through opening for the profile strand 2 is delimited by calibrating surfaces 3, towards which the profile strand 2 is pulled by suction in the conventional manner via vacuum slots which are not shown for reasons of clarity of the illustration. The extruded plastic profile comprises in the region of a leg 4 an undercut longitudinal groove 5, into which engages a form nose 6 projecting beyond the adjacent calibrating surface 3 for calibration. The molding body 1 divided by separating surfaces 7 which extend in the direction of passage of the profile strand 2 in order to compose the profile cross section in a simple manner by the calibrating surfaces 3 from the individual molding strips 8.

Figure 2:
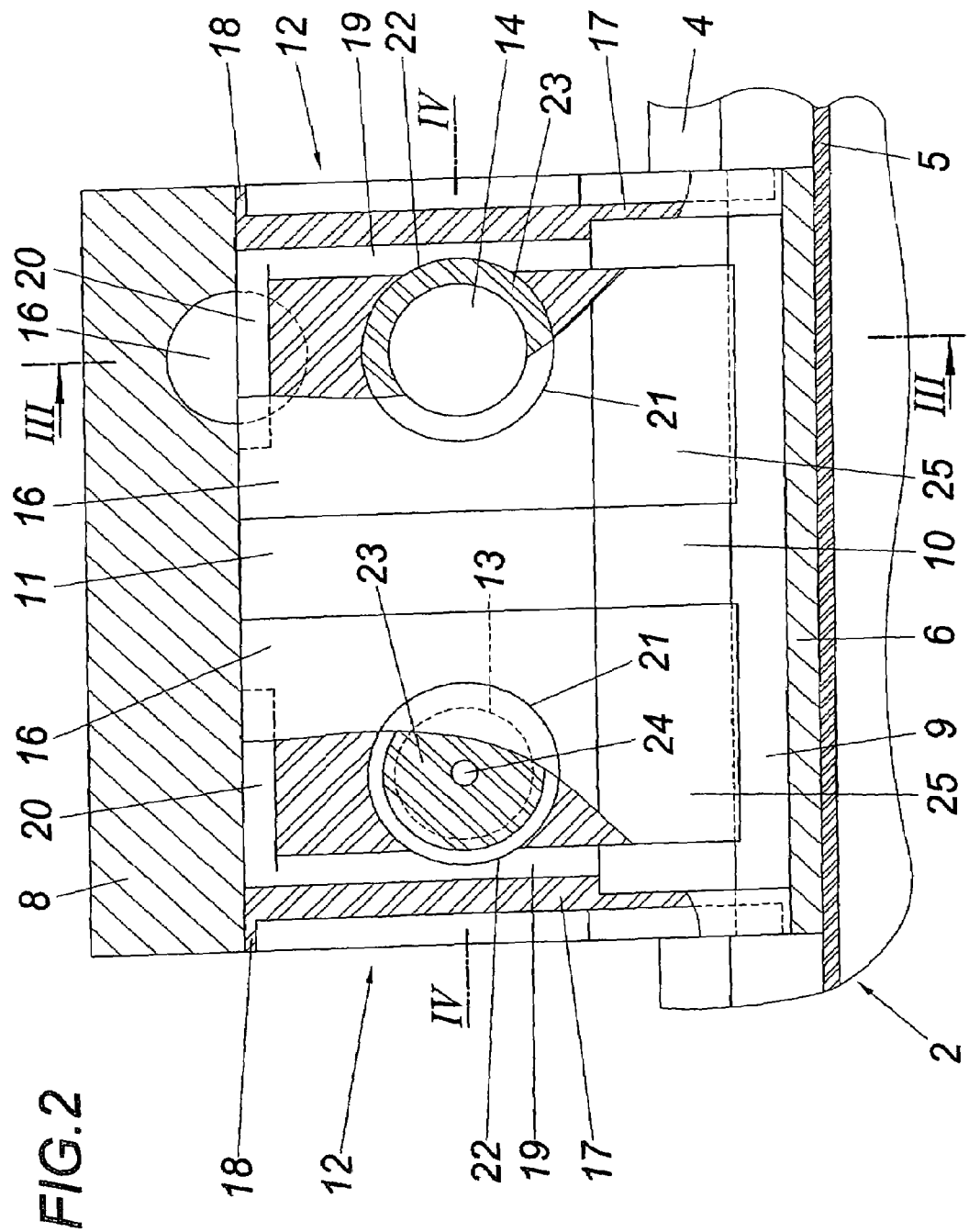
FIG. 2 shows a sectional view along line II-II of FIG. 1 on an enlarged scale.
Figure 3:
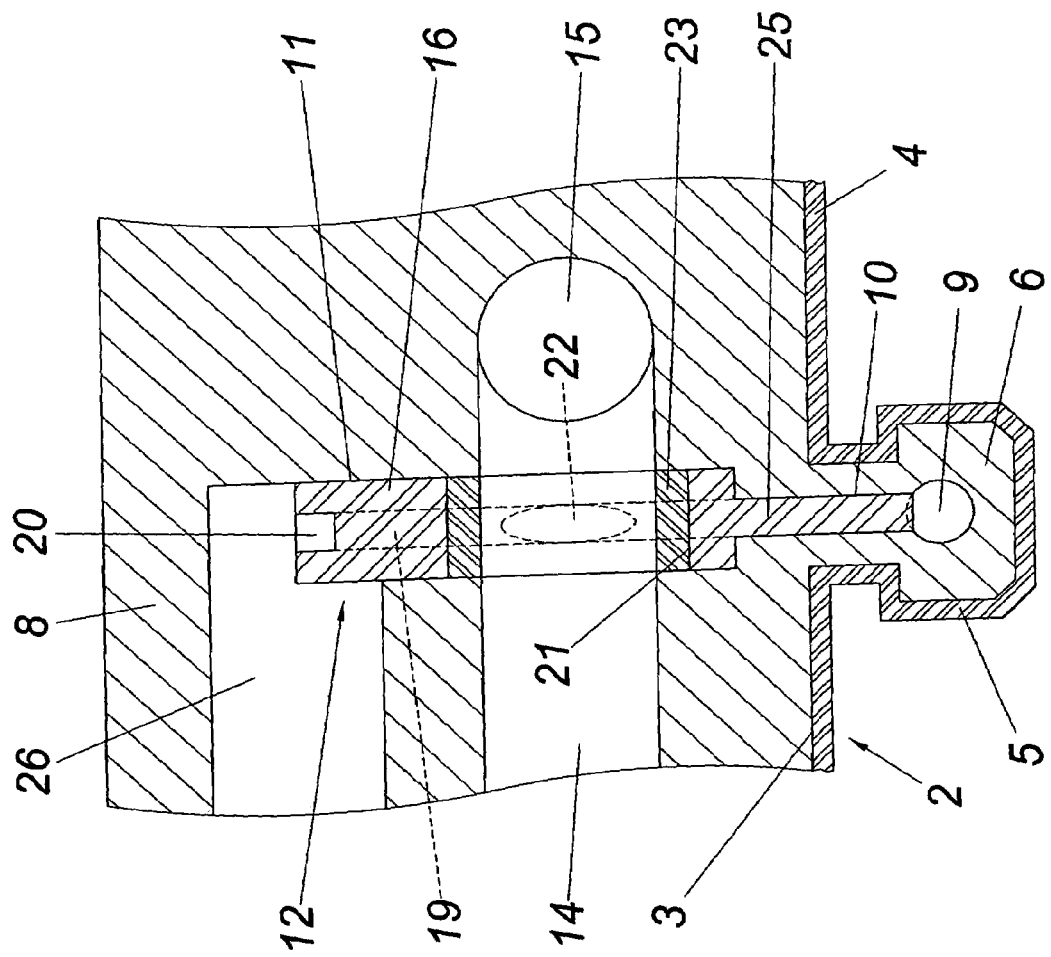
FIG. 3 shows a sectional view along line III-III of FIG. 2.
Figure 4:
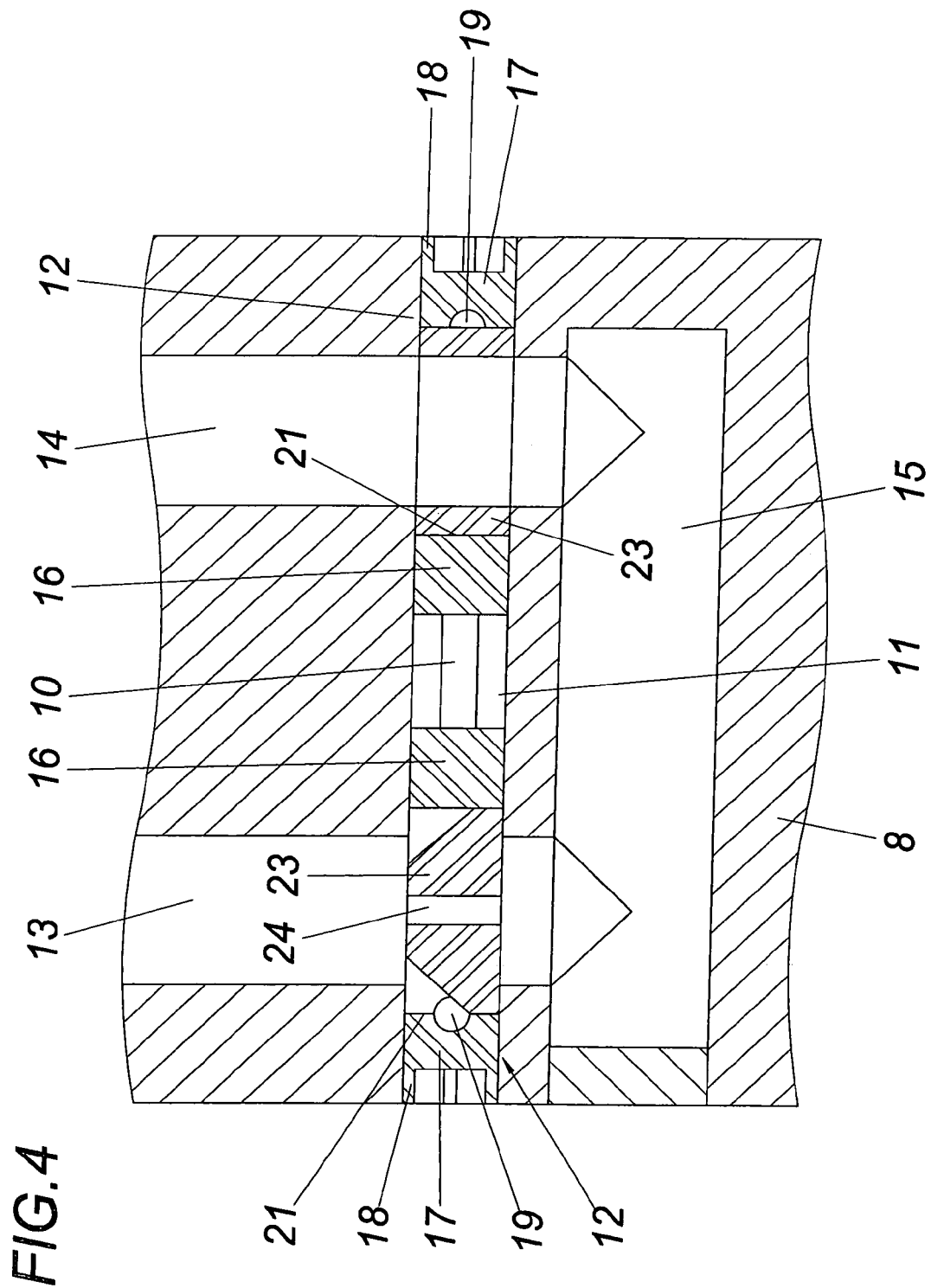
FIG. 4 shows a sectional view along line IV-IV of FIG. 2.

In order to prevent any adherence of the profile strand on the calibrating surfaces 3, which profile emerges in a molten state from the extrusion die, and in order to keep the take-off resistance of the profile strand 2 from the calibrating body 1 within permissible limits under the conditions of an immediately starting solidification of the melt, the calibrating body 1 needs to be cooled especially in the inlet region to a sub-critical temperature of less than 50 to 70° C. for example. For this purpose, the molding strips 8 of the calibrating body 1 are provided with coolant bores, through which coolant (which is generally water) is pumped in a circulation. Whereas the calibrating surfaces 3 can be cooled in a relatively simple manner by providing respective coolant bores, the cooling of the form noses 6 which are used for calibrating the longitudinal grooves 5 poses difficulties due to the small cross section of these form noses 6. In order to avoid these difficulties, the form nose 6 is provided with a cooling channel 9 which extends in the pass-through direction of the profile strand 2 and which is connected by a slot 10 with a receiving recess 11 for the sealing elements 12. The cooling channel 9 thus forms in combination with the connecting slot 10 and the receiving recess 11 a common pass-through opening in the molding strip 8 of the calibrating body 1 forming the form nose 6 (as shown in FIGS. 2 to 4), which opening continues in the direction of passage of the profile strand.

The molding strip 8 is provided with coolant bores 13 and 14 which extend transversally to the form nose 6, penetrate the receiving recess 11 and open into a connecting bore 15 which is perpendicular to the same, so that the coolant entering through the coolant bore 13 is supplied via a bore 15 to the coolant bore 14 connected to a coolant discharge.

Figure 6:
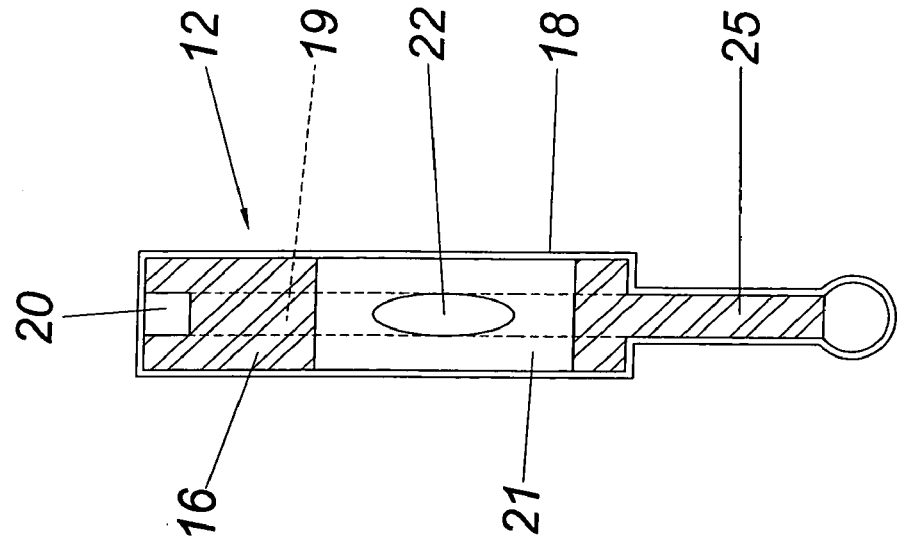
FIG. 6 shows a sectional view along line VI-VI of FIG. 5.
Figure 5:
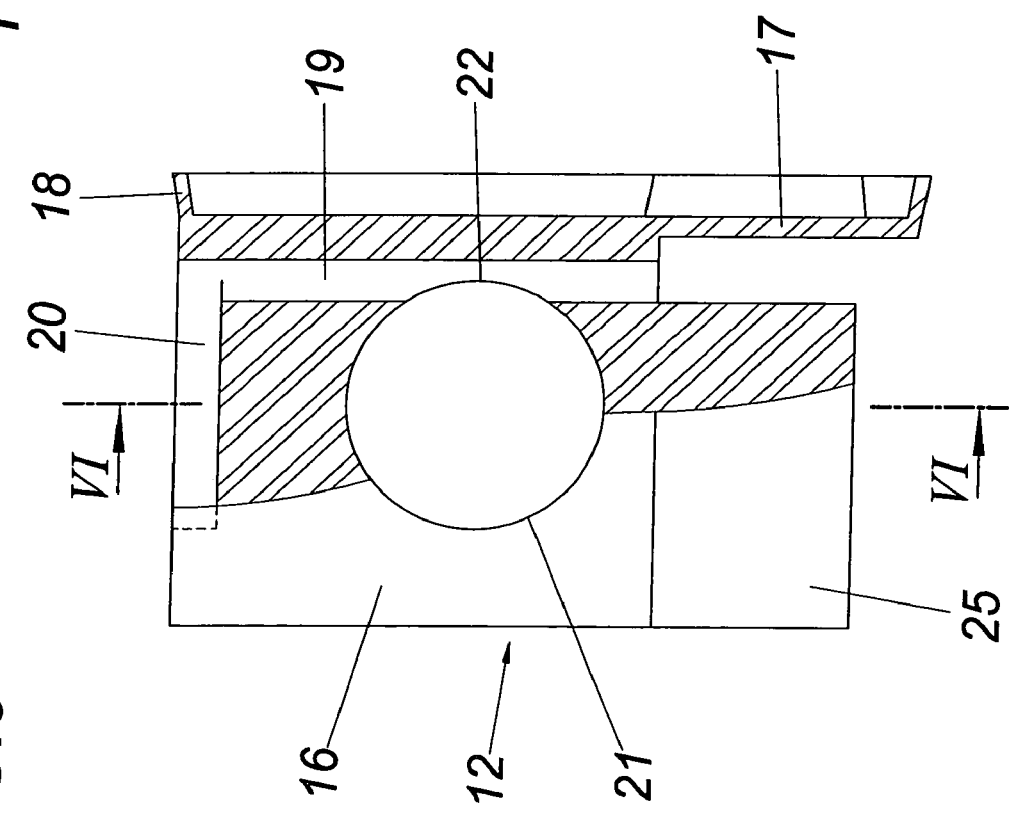
FIG. 5 shows a sealing element in a partly vertical sectional side view.

According to FIGS. 5 and 6, the sealing elements 12 comprise a molding body 16 engaging in the receiving recess 11 of the profile strip 8, which body carries a face wall 17 on the respective outside which not only extends beyond the receiving recess 11 but also beyond the connecting slot 10 and the cooling channel 9 in order to seal off the entire pass-through opening on the face side. For the purpose of better sealing, the face wall 17 is provided with a circular boundary web 18 which extends conically towards the outside and which on engagement in the pass-through opening of the molding strip 8 is pressed in a sealing manner against the opening wall, as is shown in FIGS. 2 and 4.

For supplying coolant to the cooling channel 9, the molding bodies 16 comprise after the face wall 17 a connecting opening 19 which extends transversally to the cooling channel 9, starts out from a recess 20 on the circumferential side of the molding body 16 opposite of the cooling channel 9 and opens into the region of the slot 10. Moreover, the molding bodies 16 of the sealing elements 12 are provided in the region of the coolant bores 13 and 14 with pass-through openings 21 which extend into the region of the connecting openings 19, thus producing an intermediate output 22 for the connecting bores 19, which output can be sealed optionally by inserts in the pass-through openings 21. The inserts 23 are not only used for the optional connection of the connecting openings 19 with the associated coolant bore 13 or 14, but also allow a throttling of the coolant flow through the coolant bores 13 and 14 in order to force a respective equalization of the flow resistances and thus a desired division of the coolant flow to the coolant bores and the cooling channel 9. According to FIGS. 2 to 4, the insert 23 is provided in the region of the coolant bore 13 with a throttling bore 24 in the region of the coolant bore 13. Since this insert is also provided with a conical configuration, a flow path to the intermediate output 22 of the connecting opening 19 remains between the insert 23 and the pass-through opening 21, through which the connecting opening 19 is in connection with the coolant bore 13. Since the recess 20 is covered by the wall of the receiving recess 11 on the circumferential side of the molding body 16 which is opposite of the cooling channel 9, coolant thus flows from the coolant bore 13 through the connecting opening 19 and the connecting slot 10 into the cooling channel 9, as is shown especially in FIGS. 2 and 4. In order to limit the coolant flow to cooling channel 9, the molding bodies 16 of the sealing elements 12 are provided with webs 25 projecting into the connecting slot 10, which webs are arranged adjacent to the orifice of the connecting opening 19.

An insert 23 in the form of a cylindrical sleeve is inserted in the pass-through opening 21 of the sealing element 12 associated with the coolant bore 14, which sleeve seals the intermediate output 22 of the connecting opening 19 relative to the coolant bore 14, so that the coolant flows from the cooling channel 9 through the connecting opening 19 into the recess 20 where a separate coolant bore 26 ends, so that the coolant from cooling channel 9 flows off via this coolant bore 26. This separate discharge of the coolant flow from the cooling channel 9 can be used advantageously for monitoring the transmissibility of the cooling channel 9.

By providing sealing elements 12 which engage on the face side into the receiving recesses 11 and which comprise connecting openings 19 for connecting the cooling channel 9 with the coolant bores 13, 14, 26 crossing the cooling channel 9 it is possible to avoid otherwise required complex connecting bores for the cooling channel 9 through the off-set throat of the form nose 6. In cooperation with respective inserts 23, flow connections adjusted to different conditions can be achieved between the coolant bores and the cooling channel, this being with the help of constructionally predetermined, uniform sealing elements 12, which as a result of their configuration which is symmetrical to a longitudinal plane can also be used on both face sides of the receiving recesses 11.

The invention claimed is:

1. An apparatus for calibrating an extruded plastic profile forming at least one longitudinal groove, comprising a calibrating body receiving the profile emerging from a shaping extrusion die for profiles, the calibrating body comprising a form nose with a cooling channel engaging in the longitudinal groove of the profile and extending in the direction of passage of the profile strand, and coolant bores extending transversally to the form nose and crossing the cooling channel, wherein the cooling channel which is open on both face sides is connected via a continuous slot with a receiving recess for sealing elements which are inserted from the open face sides and form the connecting openings for a flow connection between the cooling channel and associated coolant bores, which receiving recess penetrates the calibrating body in the direction of passage and extends into the region of the coolant bores.

2. An apparatus according to claim 1, wherein the sealing elements comprise a molding body engaging in the receiving recess and comprising an outer face wall which outwardly seals the cooling channel, the receiving recess and the slot between the cooling channel and the receiving recess.

3. An apparatus according to claim 2, wherein the face walls of the sealing elements comprise a circular boundary web which extends outwardly in a conical manner.

4. An apparatus according to claim 2, wherein the molding body of the sealing elements carries inserts in a pass-through region of the coolant bores penetrating the receiving recess, which inserts control the flow rate through the coolant bores.

5. An apparatus according to claim 4, wherein the connecting openings of the sealing elements comprise an intermediate output which is sealed by an insert.

6. An apparatus according to claim 1, wherein a filling element is inserted between the sealing elements into the receiving recess of the calibrating body.

7. An apparatus according to claim 1, wherein the connecting opening of the sealing element associated with a discharge end of the cooling channel is in flow connection with a separate coolant bore for discharging coolant.

* * * * *